UNITED STATES PATENT OFFICE.

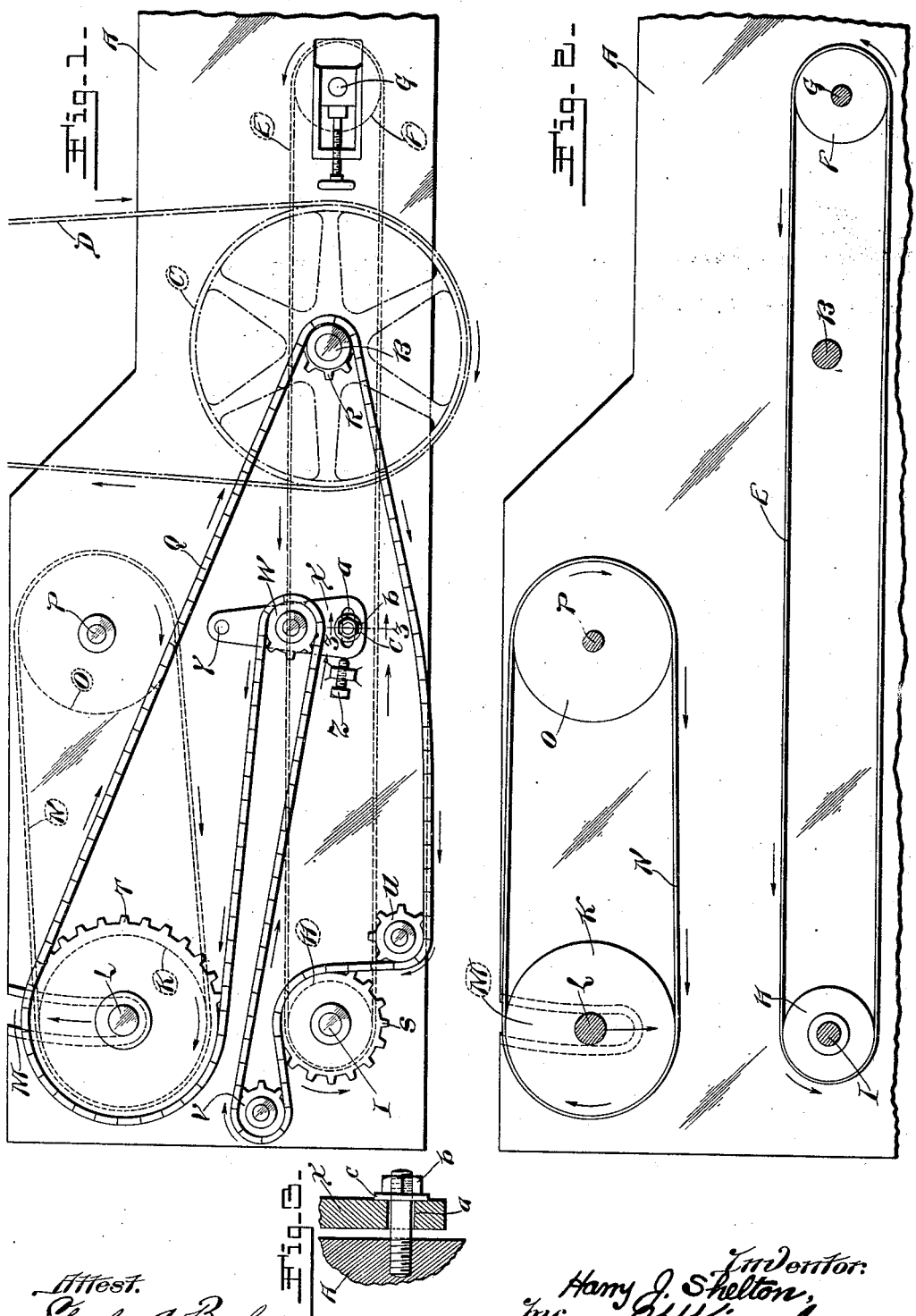

HARRY J. SHELTON, OF ST. LOUIS, MISSOURI.

FEED MECHANISM FOR SHREDDERS.

1,319,122.  Specification of Letters Patent.  Patented Oct. 21, 1919.

Application filed February 1, 1919. Serial No. 274,537.

*To all whom it may concern:*

Be it known that I, HARRY J. SHELTON, a citizen of the United States, residing in the city of St. Louis and State of Missouri, have invented a new and useful Improvement in Feed Mechanism for Shredders, of which the following is a full, clear, and exact specification, reference being had to the accompanying drawings, which form a part thereof.

My invention relates to the feed mechanism for shredders used for grinding and shredding fibrous material, such as alfalfa, pea vines and similar substances.

The object of my invention is to provide a feed mechanism in which the driving means is rugged and simple, and which does not require much machine work of an exact character; and a further object of my invention is to provide a feed mechanism that is equipped with a driving means that will allow of self adjustment of the feed device to adapt itself to the varying thicknesses of the layer of material being conveyed thereby.

My invention is fully shown in the accompanying drawings, where Figure 1 is a vertical side view of the mechanism; Fig. 2 is a vertical interior view partly in section; and Fig. 3 is a section along the line 3—3 of Fig. 1.

Referring to the figures, A is a housing or casing which is supposed to be attached at its left end to the shredder, not shown, in connection with which the feed mechanism is to be used. B is a main drive shaft having mounted thereon a pulley C and belt D. The belt D engages with the pulley on a suitable motor, not shown. E is a feed belt on which the material to be shredded is placed and by which this material is carried forward, that is, toward the shredder. The belt E embraces the drums F and H which are mounted on shafts G and I, respectively. The shaft I is fixed in position while the shaft G is made adjustable, as shown in Fig. 1, so as to allow the belt to be tightened or loosened as occasion may require. K is a feed drum placed above the belt E, and preferably above the drum H, as shown. The feed drum K is mounted on the shaft L which is free to move up and down in the guide-ways M formed in the sides of the casing. The drum K is preferably provided with a belt N which passes over the second pulley O mounted on the shaft P which is arranged in fixed position with respect to the frame A. When the feed drum K is provided with the belt N, as shown in the drawings, the guide-ways M are arcs of a circle whose center is the center of the shaft P.

The mechanism by which the feed belt E and the feed drum K are driven is preferably arranged outside of the casing, as shown in Fig. 1, and it comprises an endless band, preferably a chain Q, as shown which engages with the main drive wheel R mounted on the drive shaft B and also with the drive wheels S and T mounted on the shafts I and L, respectively. The main drive wheel is preferably mounted on the frame near the outer end, as shown, while the drive wheels for the feed belt and the feed drum are mounted near the inner end of the frame adjacent to the shredder into which the material is to be fed. The single endless band Q is arranged to engage the three drive wheels, R, S and T; and it has a loop extending toward the main drive wheel R between the drive wheels S and T, so as to allow the shaft L, carrying the drive wheel T, to rise or fall in the guide-ways M without interfering with the operation of the band. The loop is provided with an idler wheel W at its end. When the band Q is a chain as shown, the drive wheels R and S are, of course, sprocket wheels as shown. The idler wheels U, V, and W are guide wheels for the chain Q. The guide wheels U and V are mounted on the frame in fixed positions, while the guide wheel W is mounted on the swinging arm X which is hung from the stub Y. The arm X is provided with a slot $a$ through which passes the cap screw $b$, by means of which the arm X is held in adjusted position. A suitable washer $c$ is provided for the screw $b$. Z is a screw by means of which the position of the arm X may be adjusted so as to tighten or loosen the endless band or chain Q, as may be necessary or desirable.

The direction of the movement of the chain Q is indicated by arrows in Fig. 1, and it is seen that the slack part of the chain lies between the wheels R and U. The material to be shredded is placed in the casing on the belt E and by this is forwarded toward the shredder. As the material approaches the shredder it is engaged by the belt N and the feed drum K and by these is compressed and at the same time forwarded toward the shredder. The weight of the drum K and the shaft L tends to compress the material near the point where it leaves the feed mechanism, and the guide-ways M allow the shaft L to move up and down so that the feed drum K is adjusted to the amount of thickness of the layer of material passing beneath it. It is evident that the band Q adjusts itself automatically to the varying positions of the shaft L.

What I claim as new and desire to secure by Letters Patent, is:

1. A feed mechanism for shredders comprising a frame, a main drive wheel mounted near the outer end of said frame, a lower forwarding device having a drive shaft positioned near the inner end of said frame, a drive wheel on said shaft for said lower forwarding device, an upper forwarding device having a drive shaft arranged to move in guide-ways formed in said frame near the inner end thereof and above said lower forwarding device, a drive wheel on said drive shaft for said upper forwarding device, a single endless band engaging said above-mentioned drive wheels and having a loop extending between said drive wheels for said upper and lower forwarding devices toward the outer end of said frame, and idler wheels whereby said band is guided.

2. A feed mechanism for shredders comprising a frame, a main drive wheel mounted near the outer end of said frame, a lower forwarding device having a drive shaft positioned near the inner end of said frame, a drive wheel on said drive shaft for said lower forwarding device, an upper forwarding device having a drive shaft arranged to move in guide-ways formed in said frame near the inner end thereof and above said lower forwarding device, a drive wheel on said drive shaft for said upper forwarding device, a single endless band engaging said above-mentioned drive wheels and having a loop extending between said drive wheels for said upper and lower forwarding devices toward the outer end of said frame, idler wheels whereby said band is guided, and means whereby said band may be tightened or loosened.

3. A feed mechanism for shredders comprising a frame, a main drive wheel mounted near the outer end of said frame, a feed belt extending from near the outer end to near the inner end of said frame, a drum arranged to drive said feed belt mounted on a shaft positioned near the inner end of said frame, a drive wheel on said shaft for said feed belt, a feed drum mounted on a shaft arranged to move in guide-ways formed in said frame near the inner end thereof and above said feed belt, a drive wheel on said shaft for said feed drum, a single endless band engaging said above-mentioned drive wheels and having a loop extending between said drive wheels for said feed belt and said feed drum toward the outer end of said frame, idler wheels whereby said band is guided, and means whereby said band may be tightened or loosened.

4. A feed mechanism for shredders comprising a frame, a drive shaft carried by said frame, a drive wheel on said drive shaft, a lower feed belt, a drum arranged to drive said lower feed belt, a shaft rotatably mounted in fixed position on which the drum for said lower feed belt is mounted, a drive wheel fixed on said shaft, an upper feed belt, a drum for said upper feed belt mounted on a shaft whose position is fixed, a drive drum for said upper feed belt mounted on a shaft which is adapted to move in guide-ways, said guide-ways being arcs of a circle whose center is the center of the shaft of the upper feed belt whose position is fixed, a drive wheel on said shaft which is movable in said guide-ways, a single endless band engaging said above mentioned drive wheels, idler wheels whereby said band is guided, and means whereby one of said idler wheels may be shifted to tighten or loosen said band.

In witness whereof I have signed my name to this specification.

HARRY J. SHELTON.

Copies of this patent may be obtained for five cents each, by addressing the "Commissioner of Patents, Washington, D. C."